United States Patent [19]

Bridges

[11] 4,261,382
[45] Apr. 14, 1981

[54] CONDENSATE DRAIN VALVES

[75] Inventor: Robert E. Bridges, Cheltenham, England

[73] Assignee: Loomhurst, Limited, London, England

[21] Appl. No.: 96,006

[22] Filed: Nov. 20, 1979

[30] Foreign Application Priority Data

Nov. 24, 1978 [GB] United Kingdom ............... 46004/78

[51] Int. Cl.³ .............................................. F16T 1/00
[52] U.S. Cl. ................................... 137/187; 137/204
[58] Field of Search ............... 137/187, 195, 204, 392, 137/177

[56] References Cited

U.S. PATENT DOCUMENTS

| | | | |
|---|---|---|---|
| 2,564,873 | 8/1951 | Wright | 137/187 |
| 2,580,132 | 5/1950 | Aikman | 137/195 |
| 3,905,385 | 9/1975 | Green | 137/187 |

Primary Examiner—Alan Cohan
Attorney, Agent, or Firm—Larson, Taylor and Hinds

[57] ABSTRACT

Disclosed is an electrically operated condensate drain valve arrangement for draining condensate from a fluid transfer system, the arrangement comprising a condensate drain valve (3), an electronic circuit (5 or 21) for controlling operation of the valve, and at least one sensing element (1 or 19 and 20) for insertion in the fluid transfer system to trigger the electronic circuit for operating the valve when a predetermined condition in the system is sensed by the sensing element; the electronic circuit including a delay means (10) imparting a desired minimum period between successive particular operations of the valve. In one use the predetermined condition is that condensate level is below the sensing element and the circuit is triggered to close the valve when this condition is sensed. In another use, in a steam system, there are two temperature sensing elements at high and low levels respectively and the predetermined condition is when steam is at both these levels, the circuit being triggered to close the valve when this condition is sensed. Use in a compressed air system is also described. In all cases the successive particular operations occurring with the desired minimum period between each are valve opening operations, and the delay means is a timer integrated circuit.

12 Claims, 11 Drawing Figures

CONDENSATE DRAIN VALVES

This invention relates to condensate drain valves.

According to the present invention there is provided an electrically operated condensate drain valve arrangement for draining condensate from a fluid transfer system, the arrangement comprising a condensate drain valve, an electronic circuit for controlling operation of the valve, and at least one sensing element for insertion in the fluid transfer system to trigger the electronic circuit for operating the valve when a predetermined condition in the system is sensed by the sensing element; the electronic circuit including a delay means imparting a desired minimum period between successive particular operations of the valve.

For a better understanding of the invention and to show how the same may be carried into effect, reference will now be made, by way of example, to the drawings accompanying this specification and in which.

Figure 1:
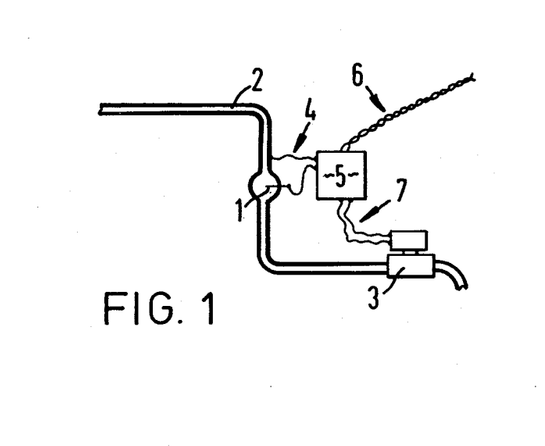
FIG. 1 is a schematic illustration of a condensate drain valve arrangement in a steam system, FIG. 2 (drawn on two sheets in parts "(A)" and "(B)") is a circuit diagram of an electronic circuit of the drain valve arrangement of FIG. 1, FIG. 3 (drawn on two sheets in parts "(A)" and "(B)") is a circuit diagram of another electronic circuit that can be incorporated in a drain valve arrangement such as that of FIG. 1.

The condensate drain valve arrangement of FIG. 1 consists of an electrical sensing probe 1 inserted in a condensate drain line 2 of the steam system upstream of a solenoid operated condensate drain valve 3 and so as to be electrically insulated from the wall of the drain line. Electrical leads 4 connect the probe 1 and the wall of the drain line 2 to an electronic circuit 5 which has voltage supply leads 6 and which is connected to the solenoid of the valve 3 by leads 7.

Figure 2A:
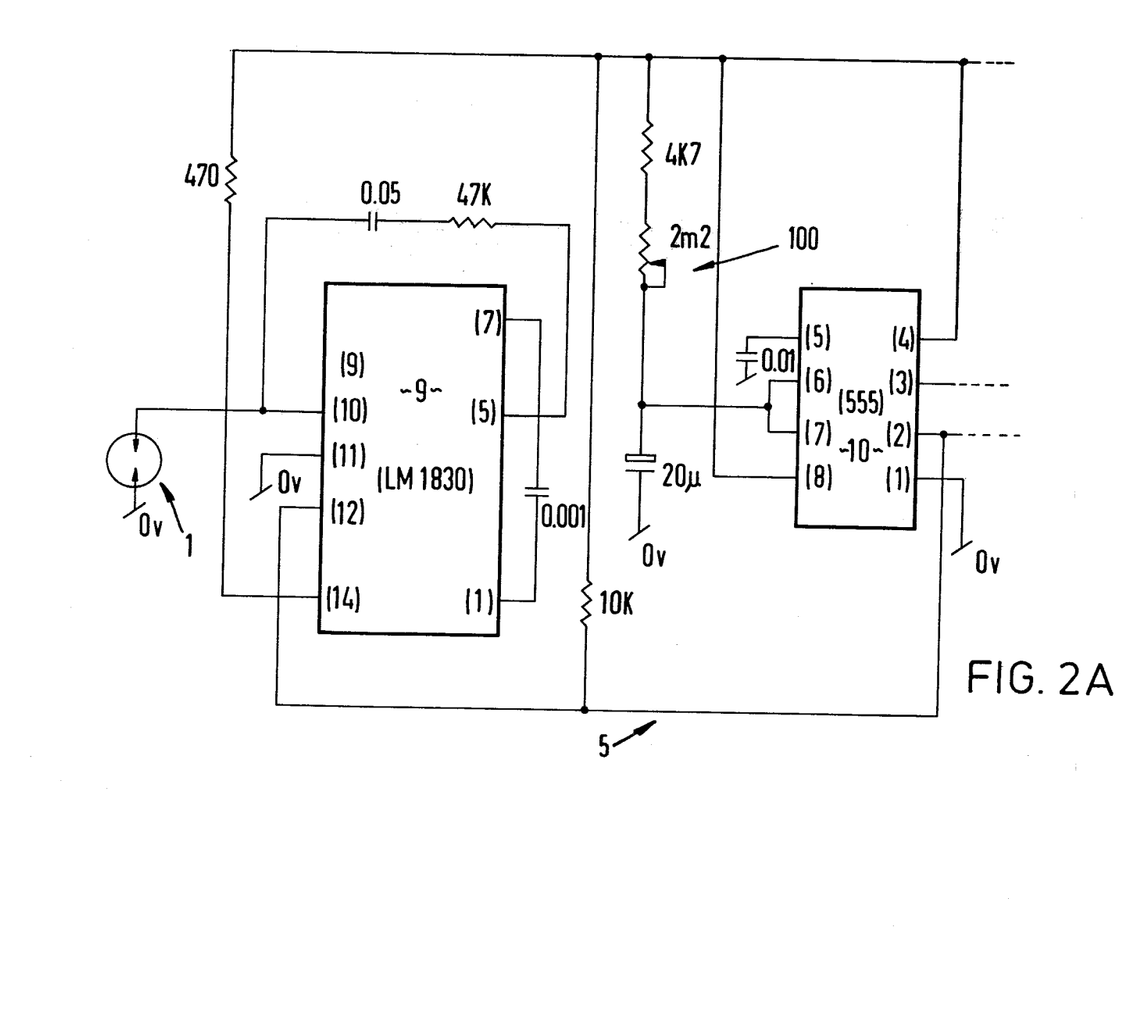
Figure 2B:
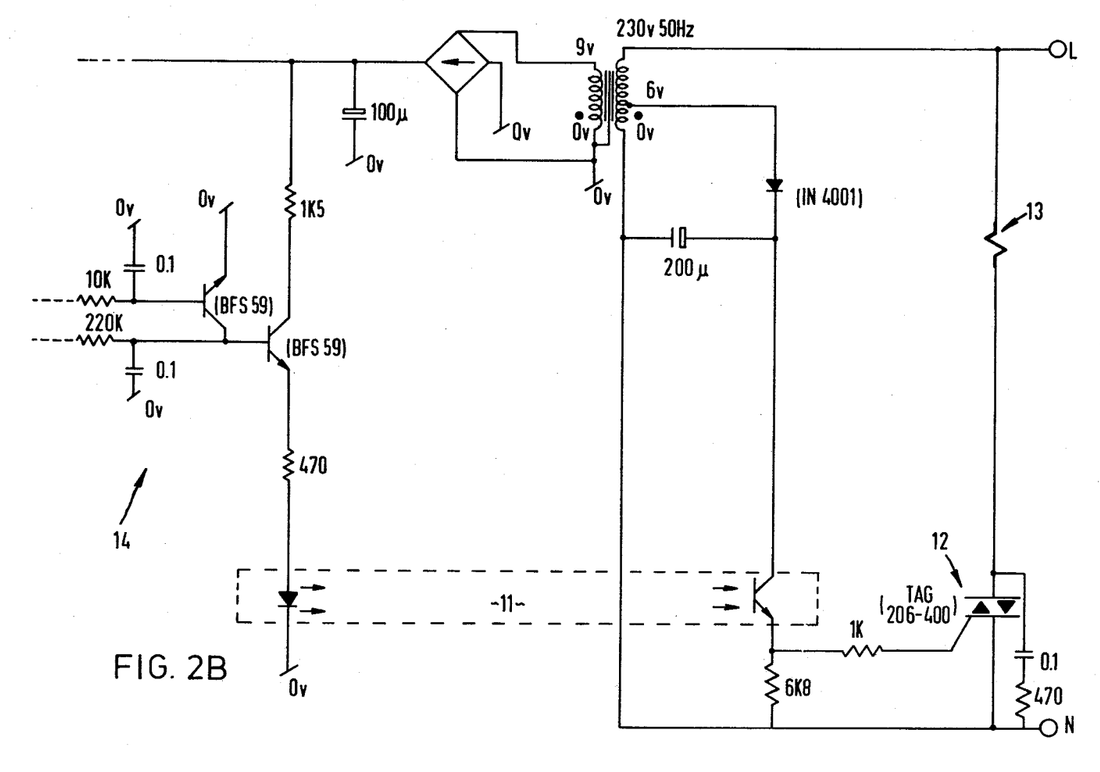

As shown in FIG. 2, the electronic circuit 5 includes a first integrated circuit 9 which serves to compare the signal from the probe 1 with an internal resistance of the circuit 9; a second integrated circuit 10 that is a solid state timer; an opto-isolator 11; and a triac 12. The coil of the solenoid of the valve 3 is represented at 13. Operation is as follows. An AC signal is passed to the sensing probe 1. If there is no condensate at the level of the probe 1 the output at pin (12) of the integrated circuit 9 oscillates at a frequency of 6 KHz. If the probe is covered by condensate there is a steady positive output at pin (12). The output from pin (12) is taken to pin (2) of the timer integrated circuit 10. Taking timer circuit pin (2) to zero volts (i.e. by feeding the 6 KHz oscillating signal to it) initiates a timing cycle during which timer circuit pin (3) is held at +V and in this condition the solenoid coil 13 is de-energised. At the conclusion of a timing cycle, and until initiation of the next timing cycle, timer circuit pin (3) is at zero volts and the transistors and solid state switches generally referenced 14 in the electronic circuit 5 switch the coil 15 to its energized condition.

At start up, if there is no condensate at the probe 1, the oscillating output of the integrated circuit 9 initiates a timing cycle (as the first excursion down to zero volts triggers the timer circuit 10). The solenoid valve is held shut. If, at the end of the first timing cycle, there is still no condensate at the probe, another cycle is initiated. When condensate has built up to submerge the probe during a timing cycle, the output of the integrated circuit 9 changes to a steady positive voltage and, at the end of this cycle, the output at the timer circuit pin (3) changes to zero volts. The solenoid valve opens and the condensate is discharged. When the probe is no longer submerged the output from the integrated circuit 9 changes back to the 6 KHz oscillation which initiates a timing cycle, simultaneously taking timer circuit pin (3) positive and de-energising the coil 13 of the solenoid valve, which closes.

Thus in the condensate drain valve arrangement of FIG. 1 incorporating the circuit 5 of FIG. 2, a single sensing element (the probe 1) sensing a predetermined condition in the steam system (condensate level below the probe 1) serves to trigger the circuit 5 to operate the valve with at least a desired minimum period between particular (valve opening) successive operations of the valve being imparted by a delay means (the timer integrated circuit 10) in the electronic circuit 5.

The time of the timer can be preset, or provision can be made for adjusting this time over a wide range, see resistor 100 in FIG. 2.

In operation of the drain valve arrangement of FIG. 1 incorporating the electronic circuit 5 of FIG. 2 the solenoid is energised continuously when the drain valve is open. In the case of the electronic circuit 5A of FIG. 3 short electrical pulses are used to open and close the valve so that the electrical energy required is minimised.

Figure 3A:
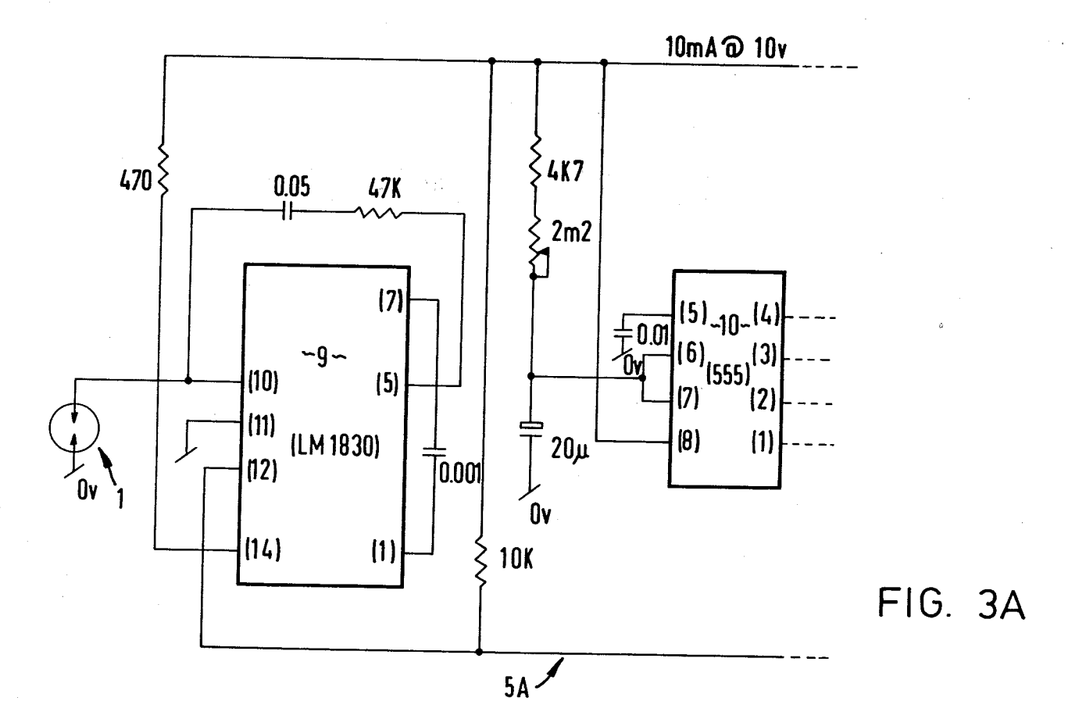
Figure 3B:
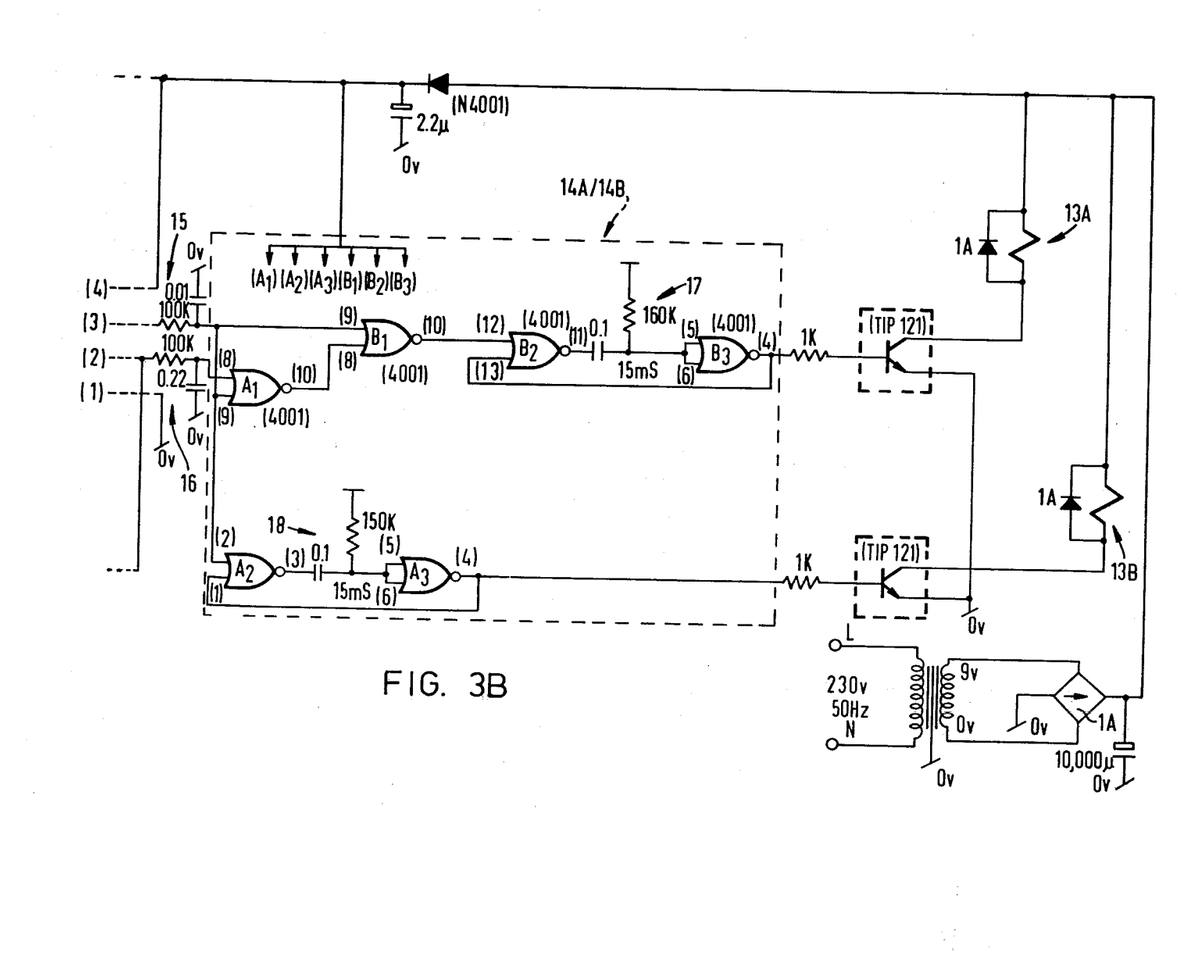

In FIG. 3 components that are the same as are used in the circuit of FIG. 2 are given the same reference numerals. Principle changes are that a pair of CMOS integrated circuits 14A, 14B and associated components replace the transistors and solid state switches generally reference 14 in FIG. 2; and the solenoid valve has two coils 13A, 13B. Respective NAND gates of the pair of CMOS integrated circuits are referenced $A_1$, $A_2$ and $A_3$ and $B_1$, $B_2$ and $B_3$.

Figure 4:
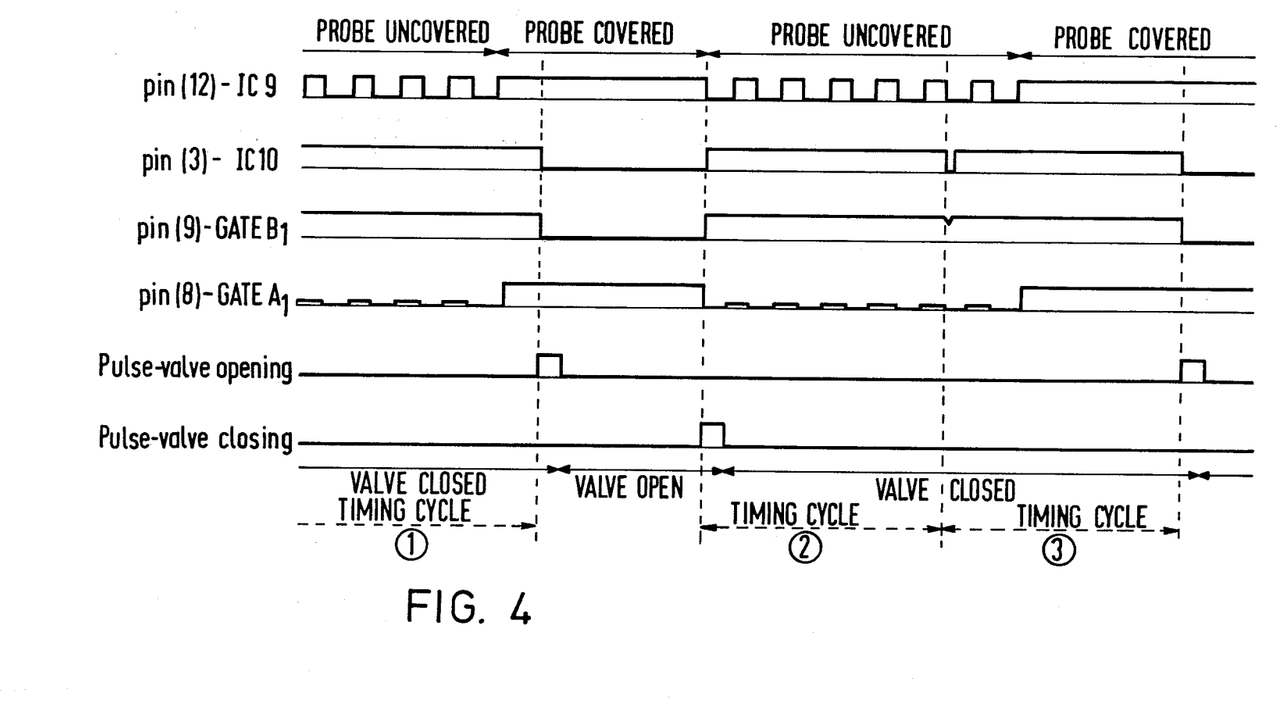
FIG. 4 is a logic diagram illustrating operation of the electronic circuit of FIG. 3.

Operation of a drain valve arrangement incorporating the electronic circuit 5A of FIG. 3 is as follows, reference also being directed to the logic diagram that constitutes FIG. 4. With no condensate at the probe 1 the output at pin (12) of the integrated circuit 9 is oscillating as described with reference to FIG. 2 and pin (3) of the integrated circuit 10 is held at +V. Consider NAND gates $A_1$ and $B_1$, pins (9) of each are at +V (connected via resistor/capicator network 15 to pin (3) of the integrated circuit 10) and pin (8) of NAND gate $A_1$ receives a small oscillation near zero volts (connected via resistor/capacitor network 16 to pin (12) of the integrated circuit 9). As NAND gate $A_1$ has +V on pin (9) and, because of the RC filter, near zero volts on pin (8) its output at pin (10) is high level. This output is connected to pin (8) of NAND gate $B_1$ and as pin (9) of this gate is at +V the output at pin (10) of this gate is low level. No pulses are fed to the solenoid coil 13A, which is the valve-opening coil, and the valve is shut.

If the probe 1 is submerged in condensate when a timing cycle concludes, pin (3) of the integrated circuit 10 goes to zero volts as previously described and hence pins (9) of the NAND gates $A_1$ and $B_1$ are taken to zero volts. Taking pin (9) of gate $B_1$ to zero volts takes pin (10) of this gate to high level and this signal is used together with NAND gate $B_2$ and a resistor/capacitor network 17 to provide a 15 ms pulse for energising the valve-opening solenoid coil 13A. The drain valve opens.

When discharge of condensate uncovers the probe 1, pin (3) of integrated circuit 10, and hence pins (9) of NAND gates $A_1$ and $B_1$, go to $+V$, as does pin (2) of NAND gate $A_2$ which is used together with a resistor/capacitor network 18 and NAND gate $A_3$ to provide, in these circumstances, a 15 ms pulse for energising the valve-closing solenoid coil 13B. The drain valve closes.

Should there be no condensate at the probe at the end of a timing cycle (as illustrated in the logic diagram of FIG. 4 at the end of the second timing cycle) another timing cycle is initiated as described for the circuit of FIG. 2. Although as this occurs pin (3) of integrated circuit 10 is taken to zero volts, this is only for an extremely short time and does not initiate valve opening as the signal is damped out by the resistor/capacitor network 15.

In place of the condensate level sensing probe, a temperature sensing element such as a thermistor or a thermocouple can be provided so that the valve will open at a condensate temperature at or below a temperature which can be an absolute temperature or some set temperature below steam temperature at the operating line pressure.

Figure 5:
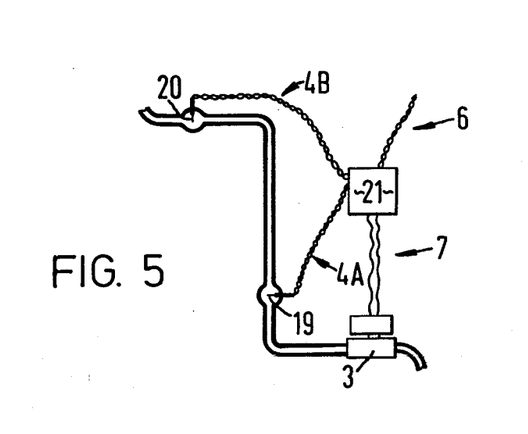
FIG. 5 is a schematic illustration of another form of steam trap arrangement, FIG. 6 (drawn on two sheets in parts "(A)" and "(B)") is a circuit diagram of an electronic circuit of the arrangement of FIG. 5, and FIG. 7 (drawn on two sheets in parts "(A)" and "(B)") is a circuit diagram of an electronic circuit of a condensate trap for a compressed air system.

FIG. 5 illustrates one such possibility. In the steam trap arrangement herein illustrated low and high level temperature sensing elements 19, 20 are inserted in the condensate drain line 2 with the element 20 in a zone normally always occupied by steam (or the high level element 20 can be in the steam supply line that the condensate line is branched off). These elements 19, 20 are connected via leads 4A, 4B to a common electronic circuit 21 which is connected to the solenoid valve 3 by leads 7 and which has voltage supply leads 6.

Figure 6A:
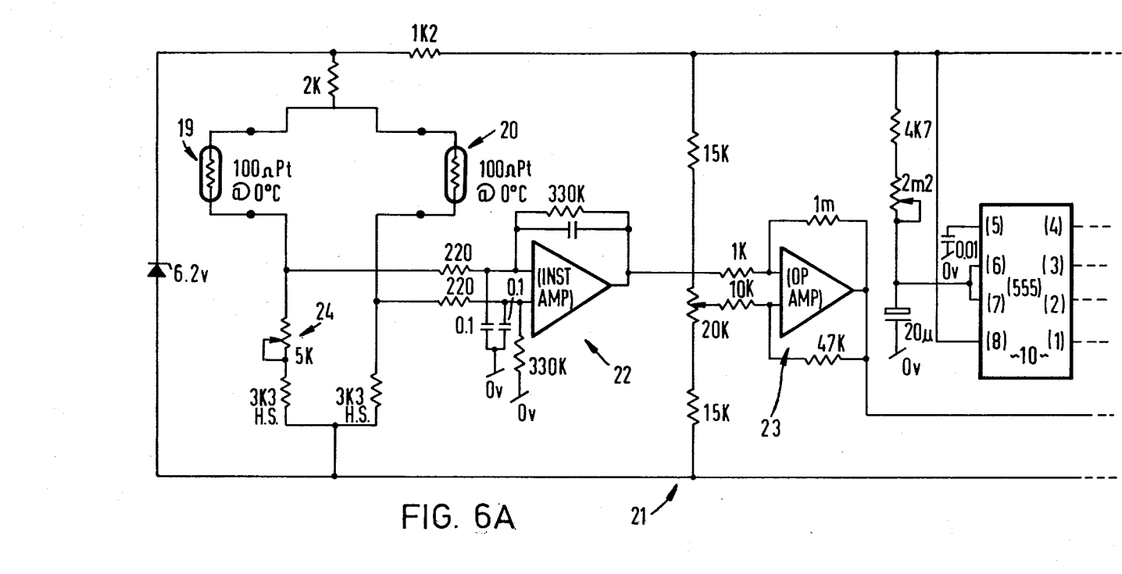
Figure 6B:
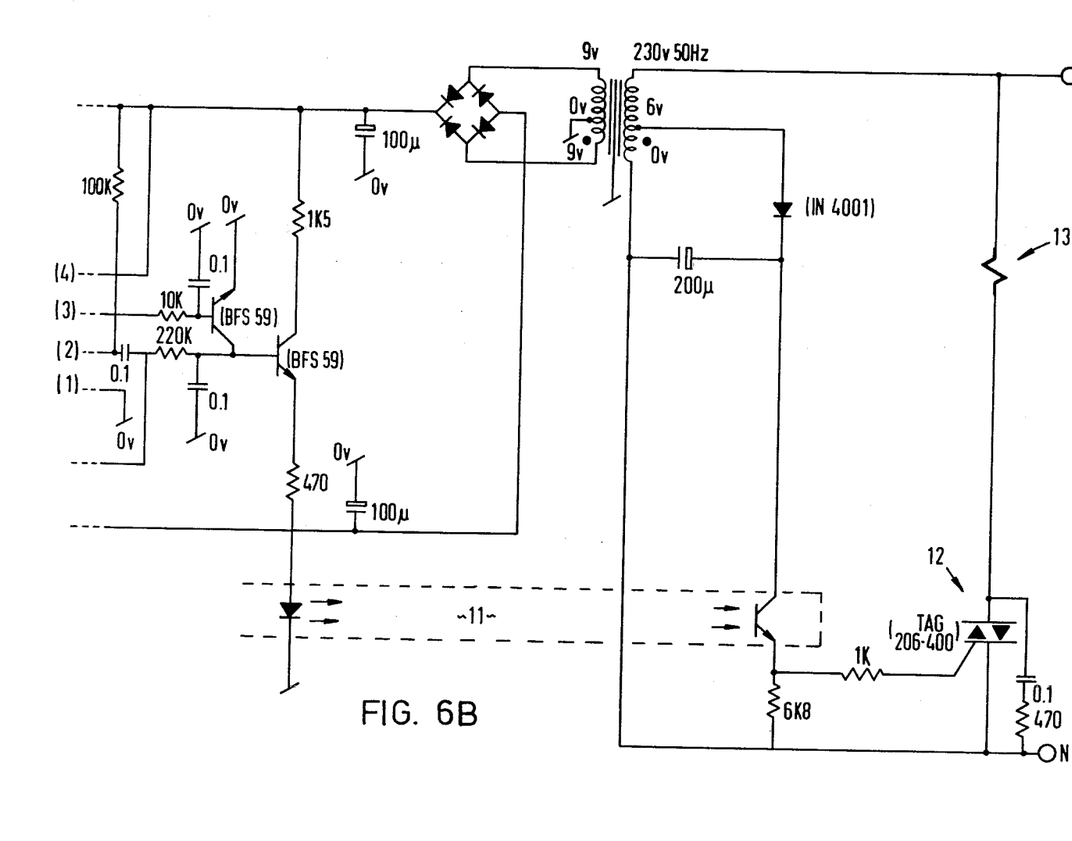

Referring to FIG. 6 one portion of the circuit 21 is substantially the same as a portion of the circuit of FIG. 2. In the remainder of the circuit the temperature sensing elements 19, 20, connected in a bridge network, replace the probe 1 of FIGS. 1 and 2 and are connected via an instrument amplifier 22 and an operational amplifier 23 to the timer integrated circuit 10.

In operation the differential temperature which can be adjusted by the 5K potentiometer 24 is detected by the instrument amplifier 22. The signal from the instrument amplifier 22 is amplified by the operational amplifier 23 before being fed to the timer 10. If the set differential temperature exists, i.e. the condensate has cooled sufficiently to be discharged, then pin (2) of the integrated circuit 10 is taken to $+V$ which, at the end of the timing cycle, causes the solenoid valve to open as described previously. When hotter condensate, or steam, covers the lower temperature sensor 19 (the upper sensor 20, as the reference, is always in steam) pin (2) is taken to zero volts which initiates a timing cycle and closes the solenoid valve.

Figure 7A:
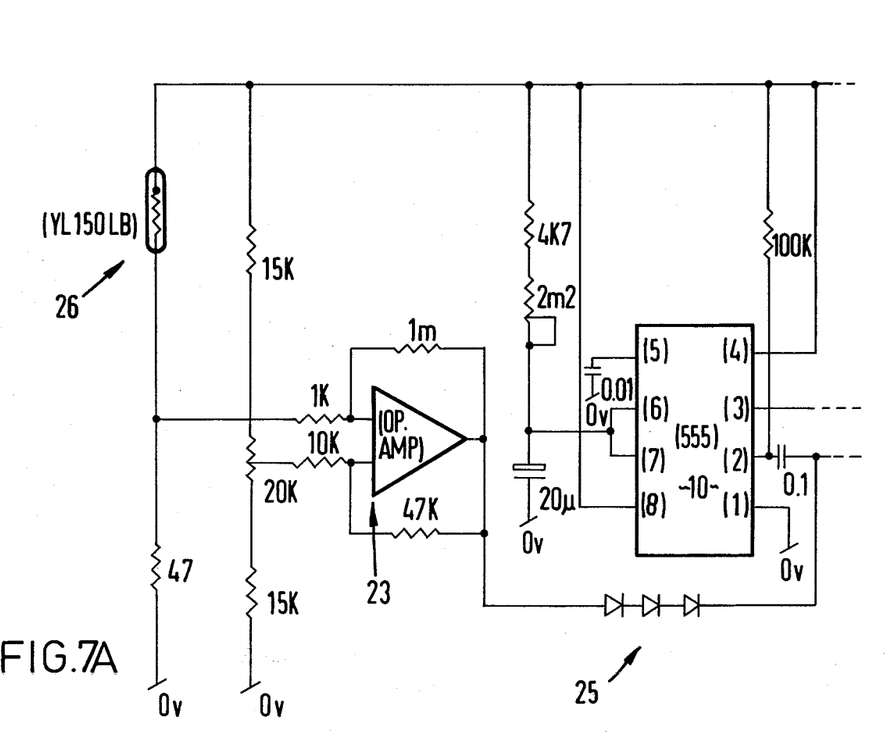
Figure 7B:
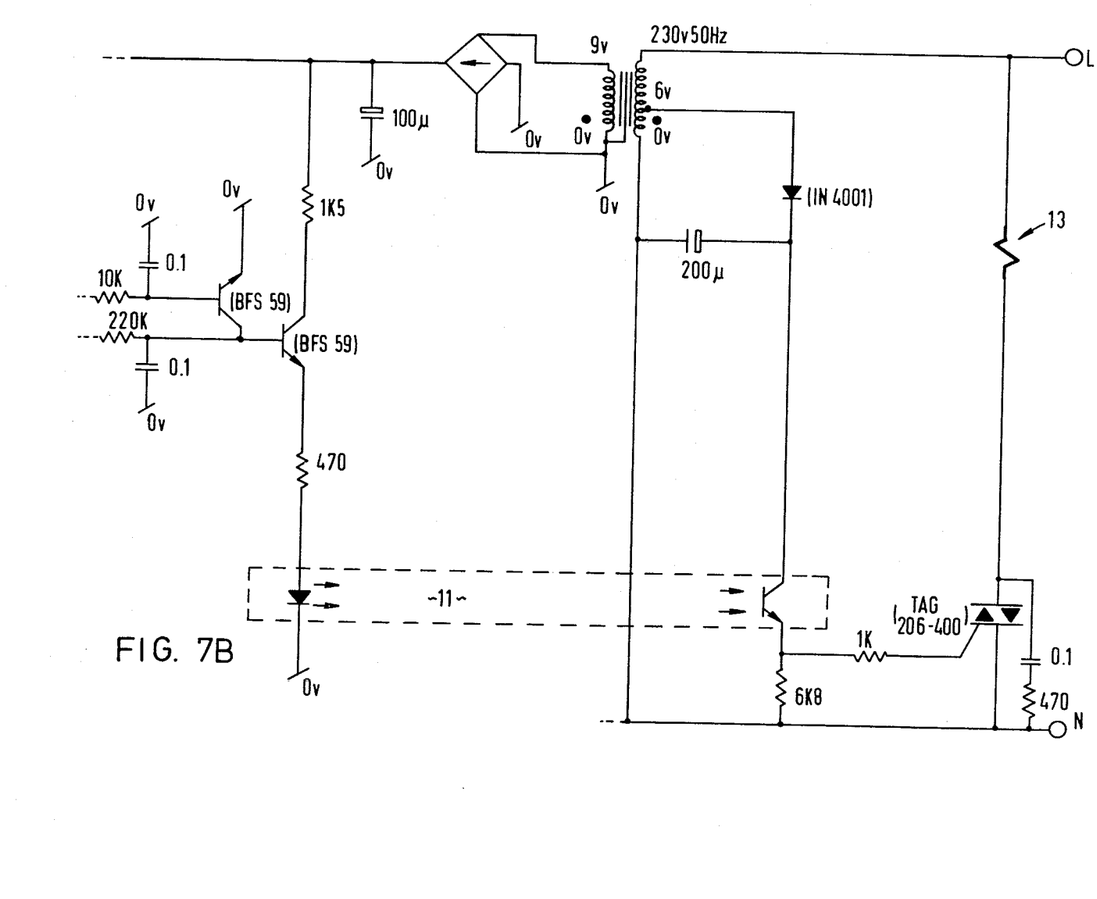

The condensate drain traps so far described have been for use in steam systems. Condensate drain traps are also utilized in compressed air systems and the electronic circuit 25 of FIG. 7 will now be described.

This circuit has a portion that is substantially the same as a corresponding portion of the circuit of FIG. 6.

In the remainder of the circuit a self-heating thermistor 26 replaces the sensors 19 and 20 and the instrument amplifier 22 of the circuit of FIG. 6. The thermistor 26 serves as a condensate level sensor.

In operation, with no condensate present the thermistor warms up and its resistance is such as to cause pin (2) of the timer integrated circuit 10 to be held at zero volts. A timing cycle is initiated and the solenoid valve is held shut. When the thermistor is submerged in condensate this has a cooling effect and the thermistor's change in resistance is detected by the operational amplifier 23 taking pin (2) of circuit 10 to $+V$. At the end of the timing cycle the solenoid valve is opened as described above, closing again when the condensate level drops away from the thermistor.

I claim:

1. An electrically operated condensate drain valve arrangement for draining condensate from a fluid transfer system, the arrangement comprising a condensate drain valve, an electronic circuit for controlling operation of the valve, and at least one sensing element for insertion in the fluid transfer system to trigger the electronic circuit for operating the valve when a predetermined condition in the system is sensed by the sensing element; the electronic circuit including a delay means imparting a desired minimum period between successive particular operations of the valve.

2. A drain valve arrangement as claimed in claim 1, wherein the sensing element is a single electrical probe; wherein said predetermined condition is that condensate level is below this probe, the circuit being triggered to close the valve when this condition is sensed and the probe serving to trigger the circuit to open the valve when condensate level above the probe is sensed, wherein said successive particular operations occurring with said desired minimum period each are valve opening operations; and wherein said delay means is a timer integrated circuit.

3. A drain valve arrangement as claimed in claim 2, wherein the electronic circuit includes a first integrated circuit which serves to compare the signal from the probe with an internal resistance of this first integrated circuit, and a second integrated circuit that is said timer integrated circuit; the probe receiving an AC signal in operation of the arrangement and the electronic circuit operating such that in the no condensate at the level of the probe condition there is an oscillating output from the first integrated circuit whereas in the condensate at the level of the probe condition there is a steady positive output from the first integrated circuit; the second integrated circuit being connected to receive the output from the first integrated circuit so as to initiate a timing cycle upon receiving said oscillating output, an output from this second integrated circuit being positive during this and any subsequent timing cycle but changing to zero at the end of any timing cycle if the output then being received from the first integrated circuit is steady positive; and wherein the valve is a solenoid-operated valve having its solenoid coil connected in the electronic circuit such that the valve is shut when the output from the second integrated circuit is positive and is open when this output is zero.

4. A drain valve arrangement as claimed in claim 2, wherein the electronic circuit includes a first integrated circuit which serves to compare the signal from the probe with an internal resistance of this first integrated circuit, a second integrated circuit that is said timer integrated circuit, and two further integrated circuits each comprising NAND gates; the probe receiving an AC signal in operation of the arrangement and the electronic circuit operating such that in the no condensate at the level of the probe condition there is an oscillating output from the first integrated circuit whereas in the condensate at the level of the probe condition there is a steady positive output from the first integrated circuit; the second integrated circuit being connected to receive the output from the first integrated circuit so as to initiate a timing cycle upon receiving said oscillating output, an output from this second integrated circuit being positive during this and any subsequent timing cycle but changing to zero at the end of any timing cycle if the output then being received from the first integrated circuit is steady positive; and wherein the valve is a solenoid-operated valve having a first solenoid coil for opening the valve and a second solenoid coil for closing the valve, these coils being connected to the NAND gates of said two further integrated circuits, via resistance/capacitor networks, and the NAND gates of the two further integrated circuits being connected to receiving the output of the second integrated circuit, such that an output from the gates of one of these two circuits which is low level when the output of the second integrated circuit is positive changes to high level when this last-mentioned output is zero to provide in conjunction with one of the resistance/capacitor networks a pulse for energising the valve-opening solenoid coil to open the valve, whereas when the output from the second integrated circuit goes to positive there is an output from the NAND gates of the other of the two further integrated circuits which in conjunction with the other of the resistance/capacitor networks provides a pulse for energising the valve-closing solenoid coil to close the valve.

5. A drain valve arrangement as claimed in claim 3 or 4, wherein the electronic circuit includes a variable resistor associated with said second integrated circuit for adjusting the length of said desired minimum period.

6. A drain valve arrangement as claimed in claim 1, for use in a steam system and wherein there are two sensing elements that are temperature sensing elements serving as low and high level temperature sensing elements the high level one of which in use of the arrangement is at a zone normally always occupied by steam; wherein said predetermined condition is that the zone at which the low level element is disposed is also occupied by steam, the circuit being triggered to close the valve when this condition is sensed and being triggered to open the valve when a temperature differential is sensed between the two zones indicating that condensate has cooled sufficiently to be discharged; wherein said successive particular operations occurring with said desired minimum period between each are valve opening operations; and wherein said delay means is a timer integrated circuit.

7. A drain valve arrangement as claimed in claim 6, wherein said two sensing elements, connected in a bridge network, are connected to said timer integrated circuit such that this integrated circuit initiates a timing cycle whenever said predetermined condition is sensed, an output from this integrated circuit being positive during this and any subsequent timing cycle but changing to zero at the end of any timing cycle if said temperature differential is then being sensed; and wherein the valve is a solenoid-operated valve having its solenoid coil connected in the electrinic circuit such that the valve is shut when the output from the timer integrated circuit is positive and is open when this output is zero.

8. A drain valve arrangement as claimed in claim 6 or 7, wherein the sensing elements are thermistors.

9. A drain valve arrangement as claimed in claim 6 or 7, wherein the sensing elements are thermocouples.

10. A drain valve arrangement as claimed in any one of claims 6 or 7, wherein the electronic circuit includes a potentiometer for adjusting the range of the sensed temperature differential.

11. A drain valve arrangement as claimed in claim 1 for use in a compressed air system, the sensing element being a self-heating thermistor that warms-up, in use, when no condensate is present at its level, and that cools when immersed in condensate, said predetermined condition being that no condensate is present at the level of the thermistor and the circuit being triggered to close the valve upon warming-up of the thermistor and being triggered to open the valve upon cooling of the thermistor; said successive particular operations occurring with said desired minimum period between each being valve opening operations, and said delay means being a timer integrated circuit.

12. A drain valve arrangement as claimed in claim 11, wherein the self-heating thermistor is connected to said timer integrated circuit such that this integrated circuit initiates a timing cycle whenever said predetermined condition is sensed, an output from this integrated circuit being positive during this and any subsequent timing cycle but changing to zero at the end of any timing cycle if the thermistor is then cooled; and wherein the valve is a solenoid-operated valve having its solenoid coil connected in the electronic circuit such that the valve is shut when the output from the timer integrated circuit is positive and is open when this output is zero.

* * * * *